No. 784,487. PATENTED MAR. 7, 1905.
C. P. GOERZ & H. KORRODI.
TANGENT SCALE TELESCOPE FOR GUNS.
APPLICATION FILED JAN. 28, 1903.
2 SHEETS—SHEET 1.
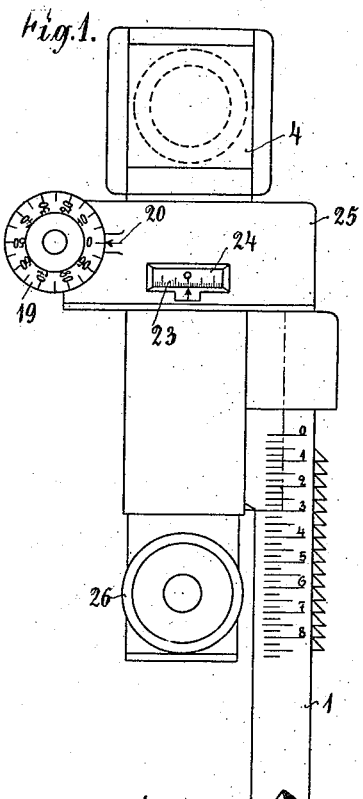
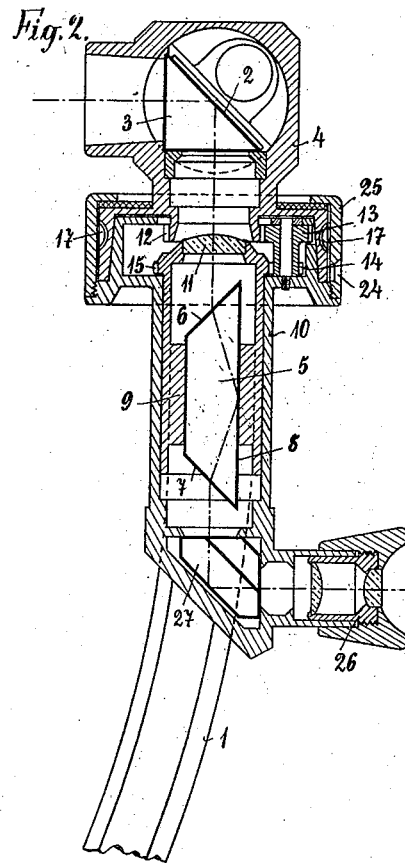
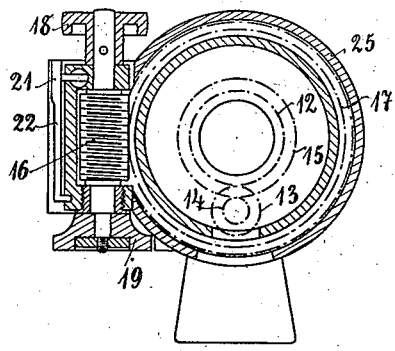
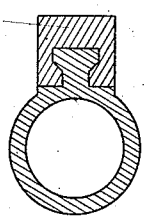

No. 784,487. PATENTED MAR. 7, 1905.
C. P. GOERZ & H. KORRODI.
TANGENT SCALE TELESCOPE FOR GUNS.
APPLICATION FILED JAN. 28, 1903.
2 SHEETS—SHEET 2.
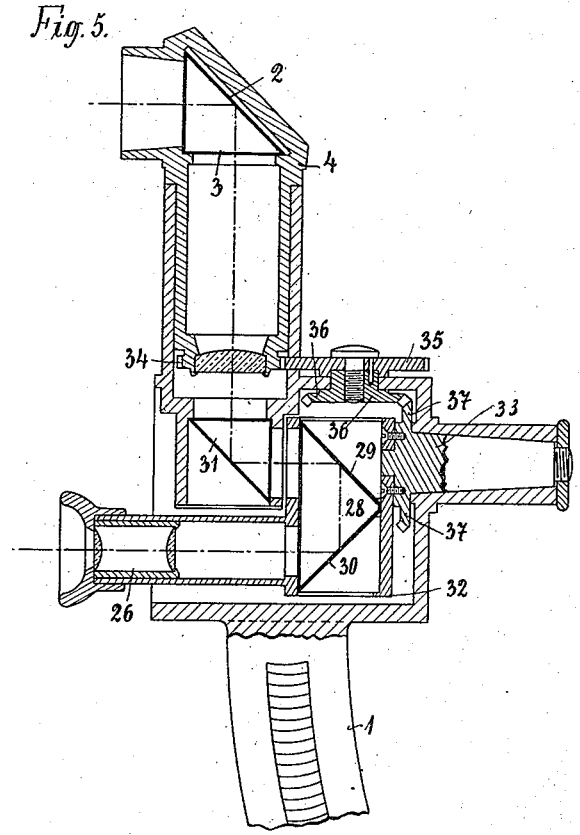
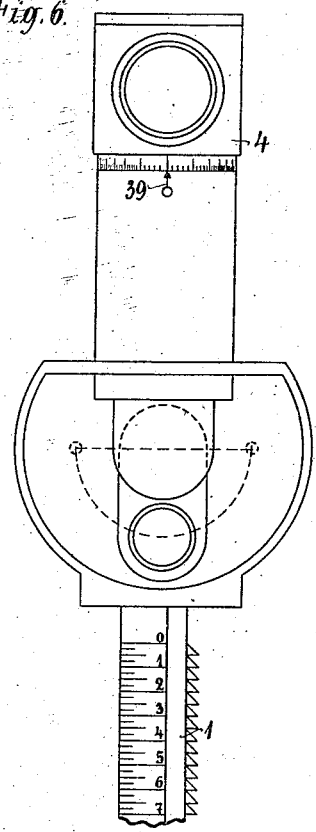
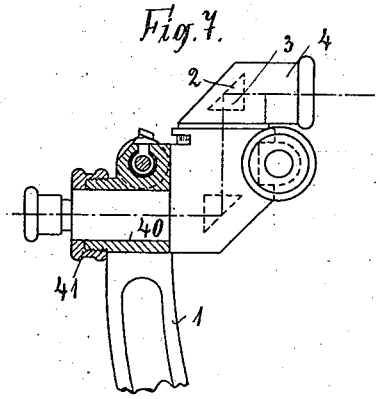
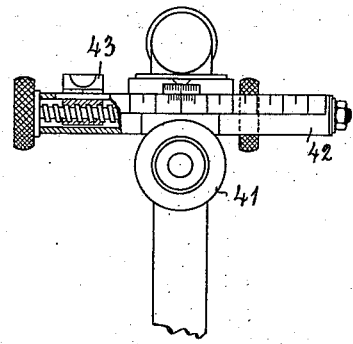
Witnesses
Inventors
Heinrich Korrodi
Carl Paul Goerz No. 784,487. Patented March 7, 1905.

UNITED STATES PATENT OFFICE.

CARL PAUL GOERZ, OF FRIEDENAU, AND HEINRICH KORRODI, OF EISENACH, GERMANY, ASSIGNORS TO THE FIRM OF OPTISCHE ANSTALT C. P. GOERZ AKTIENGESELLSCHAFT, OF FRIEDENAU, GERMANY.

TANGENT-SCALE TELESCOPE FOR GUNS

SPECIFICATION forming part of Letters Patent No. 784,487, dated March 7, 1905.

Application filed January 28, 1903. Serial No. 140,952.

*To all whom it may concern:*

Be it known that we, CARL PAUL GOERZ, manufacturer, of 45 and 46 Rheinstrasse, Friedenau, near Berlin, and HEINRICH KORRODI, captain of artillery, of 2 Theatergasse, Eisenach, Germany, have invented certain new and useful Improvements in Tangent-Scale Telescopes for Guns, of which the following is a specification.

With the known arrangement of pointing instruments on guns, irrespective of whether combined with the tangent-scale or mounted on other parts of the gun, we have the drawback that the telescopes, in spite of their being turnable on a vertical axis, can only with difficulty and in some cases not at all be adjusted for auxiliary aims on the right or left or still less in the rear and compel the pointer to assume awkward and uncomfortable positions, the consequence of this being that the protection of the pointer by the shield is more or less illusory, and, moreover, the pointing of the piece of ordnance is delayed, as the pointer cannot as a rule at one and the same time sight the target and turn the hand-wheels of the machine for pointing the gun, so that for this latter function another gunner is required. This drawback will in all probability become all the more momentous and onerous, as the field-pieces of the future will most likely be all provided with protecting-shields which will not allow of a sighting of auxiliary aims not lying directly in the firing-line.

The object of the present invention is to remove this drawback with regard to the sighting of auxiliary aims on either side of the firing-line or in the rear and to allow the pointer a sighting of auxiliary aims without compelling him to leave his usual place at the gun which he occupies for a direct pointing of the gun over notch and bead. This object is attained by provided the head of the tangent-scale of the gun with a telescope having a revolving reflector for receiving the rays of light falling upon it. This revolving reflector arranged in front of the objective or in combination with the objective has a sweep all around the horizon and throws the rays into a stationary part of the telescope-casing, whence they are conveyed either directly through an ocular to the perception of the pointer or more suitably after having passed through prisms which give them the desired direction.

The natural sighting or observing direction being the horizontal or nearly horizontal—that is to say, the same direction as that of the rays proceeding from the object on which the gun is to be laid—it is advisable to place into the path of the rays reflected by the objective reflector a second reflector which throws them back a second time and in an essentially horizontal direction; but with this arrangement and a revoluble objective reflector the consequence would be that upright images could only be obtained if the objective reflector and the second reflector were in a position parallel to each other, whereas in all other positions of the objective reflector inclined images would be the result. To obviate this drawback, it is advisable to use telescopes fitted not only with a revolving objective reflector and a stationary ocular reflector, but such wherein there is inserted, moreover, into the path of the rays another reflecting system, (or a prism with one reflecting and at least two refracting faces,) of which at least one reflecting-face is pivoted on an axis parallel to the direction of the rays in the space behind the reflector. By a corresponding turning of the revolving reflector (or reflectors) inserted into the path of the rays a righting of the images can be effected. In order to obtain upright images at once and in any position of the objective reflector, telescopes are used in which the prism righting the images is coupled to the objective reflector in such a way that it participates in the revolutions of the objective reflector, its circular velocity being, however, only half that of the objective reflector.

The new tangent-scale telescope is illustrated in the accompanying drawings, wherein similar numbers refer to similar parts throughout the several views.

Figures 1 to 4 show a form of construction in which there is inserted a prism with two refracting and one reflecting face into the path of the rays coming from the revolving reflector. Figs. 5 and 6 show a form of construction of the tangent-scale telescope, in which two revolving reflectors formed by two reflecting-faces of a prism are inserted into the path of the rays. Figs. 7 and 8 illustrate a special mode of fixing the telescope to the pointing-arc, which arrangement permits of pointing either over notch and bead or through the telescope.

The pointing-arc carrying the telescope is designated in all the figures with 1. The reflector which receives the rays from the target—that is to say, from a point to which the telescope is leveled—is marked with 2. The reflector constitutes a reflecting-face of a prism 3. The prism 3 is fixed in a rotary casing 4. With regard to these parts all the forms of construction shown in the drawings are uniform, wherefore these parts have in all the drawings been marked with the same numbers.

In the following is given a more detailed description of the different forms of construction.

In the form shown in Figs. 1 to 4 the rotating part 4 of the case is placed like a cap on the casing proper, which latter serves in its turn as a guide for the cap 4. The righting-prism, the object of which is to right the images, is designated with 5. This righting-prism, which refracts the rays on its faces 6 and 7 and reflects them on its face 8, is fixed in a socket 9, arranged pivotally in the tube-shaped case 10. The socket 9 carries, further, at its upper end the objective 11. The socket 9 is coupled with the cap 4, for which purpose the cap is provided with a spur-gear 12, which engages a pinion 13; the axle of which pinion 13 carries, moreover, a second gear 14, which engages a spur-gear 15 of the socket 9. The transmitting ratio of the coupling parts between the cap 4 and the socket 9 is of a kind that the socket 9 on the cap 4 being turned turns with half the circular velocity of the latter. To allow of a very accurate adjustment of the reflector 2, a worm 16 has been provided which engages the thread 17 of cap 4. On the axle of the worm 16 are arranged at opposite ends an adjusting-button 18 and divisions of a circle 19. The latter, with the aid of an index 20, allows of reading even the smallest turnings of the worm. The worm 16 can be put out of gear with the thread 17, so as not to prevent the rapid or rough adjustment of the gun by a direct turning of the cap 4. To this end the worm pivots on a pin 21 and is held in gear only by a spring 22. To read the position on the cap 4 itself, a scale 23 is provided on the same which can be seen through an opening 24 in the wall of a cap 25, to which is affixed the prism-case 4. Between the prism 5 and the ocular 26 a tectiform prism 27 is fixed in the case.

The connection between the telescope and the pointing-arc 1 is effected by a dovetail guide, as illustrated in Fig. 4.

The path of the rays of light through the telescope is as follows: The rays coming from the target are refracted on the reflector 2. They thereupon pass through the objective 11, are then refracted on face 6 of prism 5, and thrown on the reflecting-face 8 of prism 5. The rays reflected by face 8 are again refracted on leaving the prism on face 7, so that they leave the prism 5 in a direction parallel to their line of incidence. The rays leaving the prism 5 are righted in their path through the tectiform prism 27 and finally pass through the ocular 26.

In consequence of the described coupling between the head of the telescope 4, carrying the reflector 2, and the socket 9, carrying the prism 5, upright images are obtained in every position of the reflector 2.

With the form of construction shown in Figs. 5 and 6 the rays are reflected twice on the faces 29 and 30 of the rotating prism, which is here marked with 28, without being, however, refracted on entering or leaving the prism. Instead of the tectiform prism 27 a simple rectangular prism 31 is used here, through which the rays pass before coming to the rotating prism 28. Also with this form of construction provision has been made for a coupling between the case 4, carrying the rotating reflector 2, and the part 32, turning on a pivot 33. This coupling is effected by a gear 34 of the rotating prism-casing 4, which engages a pinion 35, firmly united with a conical wheel 36. The latter gears with another conical wheel 37, turning on the pivot 33. Also here the ratio of transmission is so calculated that the prism 28 is turned automatically with half the circular velocity of the prism 3 when the tube 4, carrying the prism 3, is turned. The path of the rays of light is indicated in Fig. 5 by a dot-and-dash line. The position of the reflector 2 is read off a scale 38, with appertaining index 39, provided on the casing 4. On the casing 4, carrying the reflector 2, being turned the ocular, designated also in this case with 26, is likewise moved, the optical axis of the same remaining, however, unchanged.

The mode of using the telescopes illustrated in Figs. 1-4, and 5 and 6 is, in principle, the same as that of other tangent-scale telescopes, with the difference that the pointer does not require in order to sight the different points of the horizon to bring the telescope or the axis of the ocular into the direction of the respective points. All that is needed is to turn the reflector in such a way that rays from the target are thrown into the telescope, so that the image of the point be visible in the ocular.

In Figs. 7 and 8 there is illustrated a combination of the telescope with the pointing-arc, which allows at will a sighting over notch and bead or through the telescope. In this case there is fixed at the top end of the pointing-arc a socket into which the telescope can be placed and fixed by a nut 41. For this arrangement a support 42 for the laterally-movable notch 43 has been provided on the pointing-arc 1 in the usual manner. The telescope would in this case not allow of a pointing over the notch along the whole length of the support 42 if the same were firmly united with the pointing-arc. This defect is removed by the described arrangement of its being detachable. The pointing-telescope itself can in other respects be constructed the same way as the forms of construction described.

What we claim as our invention, and desire to secure by Letters Patent of the United States, is—

1. In combination with a tangent-scale for guns, a telescopic attachment mounted thereon, the same comprising a pivotally-arranged telescope, and means for mounting the same on said scale, said telescope being provided with a reflecting means adapted to sweep the horizon in the rotation of the telescope and reflect the rays coming from any point of the horizon always in the same direction, so that the same can be seen by the pointer without his changing his position, substantially as set forth.

2. In combination with a tangent-scale for guns, a telescopic attachment mounted thereon, the same comprising a pivotally-arranged telescope, and means for mounting the same on said scale, said telescope being provided with a reflecting means adapted to sweep the horizon in the rotation of the telescope and reflect the rays coming from any point of the horizon always in the same direction, so that t e same can be seen by the pointer without his changing his position, and an adjusting device for showing the position of the telescope and reflector at any time, substantially as set forth.

3. In combination with a tangent-scale telescope for guns, a pivotally-arranged reflector sweeping, in its rotation, the horizon, a further system of reflectors inserted into the path of the rays coming from the rotating reflector, the latter system of reflectors possessing at least one reflecting-face pivoted on its axis, said axis being parallel to the direction of the axial ray in the air-space traversed by it immediately before its falling upon the reflecting-face, substantially as set forth.

4. In combination with a tangent-scale telescope for guns a pivotally-arranged reflector sweeping in its rotation the horizon, an index device showing the position of the reflector, a further system of reflectors inserted into the path of the rays coming from the rotating reflector, the latter system of reflectors possessing at least one reflecting-face pivotal on an axis, said axis being parallel to the direction of the axial ray in the air-space traversed by it immediately before its falling upon the reflecting-face, substantially as set forth.

5. In combination with a tangent-scale telescope for guns, a pivotally-arranged reflector sweeping, in its rotation, the horizon and reflecting the rays coming from any point of the horizon always in the same direction, a rotating prism inserted into the path of the rays coming from the rotating reflector, in such a manner that the axial ray, after being reflected at least once, leaves the prism in a direction parallel to its direction of incidence, the axis on which the prism turns being parallel to the direction of the incidence and the emergency of the axial ray, and the prism being coupled with the rotating reflector in such a manner that, on the latter being rotated, said prism will be likewise and automatically rotated, substantially as set forth.

6. In combination with a tangent-scale telescope for guns a pivotally-arranged reflector, sweeping in its rotation the horizon and reflecting the rays coming from any point of the horizon always in the same direction, an index device showing at any time the position of the reflector, a rotating prism inserted into the path of the rays coming from the rotating reflector, in such a manner that the axial ray, after being reflected at least once, leaves the prism in a direction parallel to its direction of incidence, the axis on which the prism turns being parallel to the direction of the incidence and the emergency of the axial ray and the prism being coupled with the rotating reflector in such a manner that, on the latter being rotated, said prism be likewise and automatically rotated with half the circular velocity of the reflector, substantially as set forth.

7. In combination with a tangent-scale for guns a telescope with a pivotally-arranged reflector sweeping in its rotation the horizon, a bore in the pointing-arc of the gun into which the telescope can be placed and from which it can be easily removed and a support on the pointing-arc for holding an adjustable notch, substantially as and for the purpose set forth.

8. The combination, with a tangent-scale for guns, of reflecting means mounted thereon to sweep the horizon and reflect the rays coming from any point of the horizon always in the same direction, so that the same can be seen by the pointer without changing his position.

Signed this 3d day of January, 1903, at Berlin.

CARL PAUL GOERZ.

Witnesses:
WOLDEMAR HAUPT,
HENRY HASPER.

Signed this 9th day of January, 1903, at Berne.

HEINRICH KORRODI.

Witnesses:
EDUARD VON WALDKIRCH,
FRITZ NASGELI.